United States Patent
Jeglinski

(10) Patent No.: US 10,057,263 B2
(45) Date of Patent: Aug. 21, 2018

(54) APPLICATION MANAGEMENT SYSTEM

(71) Applicant: Cay Jeglinski, Munich (DE)

(72) Inventor: Cay Jeglinski, Munich (DE)

( * ) Notice: Subject to any disclaimer, the term of this patent is extended or adjusted under 35 U.S.C. 154(b) by 53 days.

(21) Appl. No.: 15/057,677

(22) Filed: Mar. 1, 2016

(65) Prior Publication Data

US 2017/0257368 A1 Sep. 7, 2017

(51) Int. Cl.
| | | |
|---|---|---|
| G06F 17/30 | (2006.01) | |
| H04L 29/06 | (2006.01) | |
| H04L 9/06 | (2006.01) | |
| H04L 29/12 | (2006.01) | |
| H04L 29/08 | (2006.01) | |
| G06F 8/65 | (2018.01) | |
| H04L 29/14 | (2006.01) | |

(52) U.S. Cl.
CPC ............ *H04L 63/0876* (2013.01); *G06F 8/65* (2013.01); *H04L 9/0631* (2013.01); *H04L 61/1511* (2013.01); *H04L 63/0435* (2013.01); *H04L 63/061* (2013.01); *H04L 63/0823* (2013.01); *H04L 67/02* (2013.01); *H04L 67/32* (2013.01); *H04L 67/34* (2013.01); *H04L 67/42* (2013.01); *H04L 63/0442* (2013.01); *H04L 63/083* (2013.01); *H04L 69/40* (2013.01)

(58) Field of Classification Search
CPC .................................................. G06F 17/30356
See application file for complete search history.

(56) References Cited

U.S. PATENT DOCUMENTS

| | | | |
|---|---|---|---|
| 7,730,523 B1 | 6/2010 | Masurkar | |
| 7,778,924 B1* | 8/2010 | Ananda .............. | G07B 17/0008 705/50 |
| 7,836,458 B1* | 11/2010 | Gwozdz .................. | H04L 29/06 709/221 |
| 2002/0087884 A1* | 7/2002 | Shacham ............ | H04L 63/0442 726/8 |
| 2004/0010603 A1* | 1/2004 | Foster ................. | H04L 63/0823 709/229 |
| 2006/0230264 A1* | 10/2006 | Catherman ......... | G06F 21/6209 713/155 |
| 2007/0061887 A1* | 3/2007 | Hoover ............... | G06F 21/6218 726/26 |

(Continued)

FOREIGN PATENT DOCUMENTS

| | | |
|---|---|---|
| WO | 01/69843 A2 | 9/2001 |
| WO | 2016/001721 A1 | 1/2016 |

OTHER PUBLICATIONS

Google: "Configuring with app.yaml—Google Cloud Platform", May 9, 2015 (May 9, 2015), XP055380078 Retrieved from the Internet: URL:https://archive.li/ZiK31, retrieved Jun. 9, 2017.

(Continued)

*Primary Examiner* — Josnel Jeudy
(74) *Attorney, Agent, or Firm* — Dilworth IP, LLC

(57) ABSTRACT

An application management system, especially a web application management system, for enabling different clients to access specific versions of an application, includes means for identifying at least one specific marker associated to the clients or to client requests, means for selecting a specific version of the application for a requesting client based on at least one identified marker, and means for delivering the selected specific version of the application to the requesting client.

20 Claims, 6 Drawing Sheets

(56) References Cited

U.S. PATENT DOCUMENTS

| | | | |
|---|---|---|---|
| 2008/0120533 A1 | 5/2008 | Lazier et al. | |
| 2008/0189542 A1* | 8/2008 | Tseng | G06F 21/10 713/2 |
| 2010/0088404 A1* | 4/2010 | Mani | H04L 67/125 709/224 |
| 2010/0131764 A1* | 5/2010 | Goh | H04L 63/0464 713/171 |
| 2010/0183017 A1* | 7/2010 | Mori | G06F 9/505 370/400 |
| 2010/0325427 A1* | 12/2010 | Ekberg | H04L 9/321 713/156 |
| 2012/0266156 A1 | 10/2012 | Spivak et al. | |
| 2013/0024851 A1* | 1/2013 | Firman | G06F 8/60 717/170 |
| 2013/0167193 A1* | 6/2013 | Brookins | H04L 63/20 726/1 |
| 2013/0219176 A1* | 8/2013 | Akella | H04L 63/0815 713/165 |
| 2013/0247005 A1* | 9/2013 | Hirsch | G06F 8/71 717/121 |
| 2013/0263260 A1* | 10/2013 | Mahaffey | G06F 21/564 726/22 |
| 2014/0317289 A1 | 10/2014 | Shahpurwala et al. | |
| 2015/0128121 A1 | 5/2015 | Garcia | |
| 2016/0112497 A1* | 4/2016 | Koushik | H04L 67/10 726/7 |

OTHER PUBLICATIONS

Extended European Search Report dated Aug. 21, 2017 from corresponding Application No. EP17155255.7, 23 pages.

\* cited by examiner

APPLICATION MANAGEMENT SYSTEM

TECHNICAL FIELD

The invention generally relates to the management of applications, and especially to the management of web applications.

BACKGROUND OF THE INVENTION

Up until now web applications are developed without giving the developers insight of application administration. On the other hand server farm administration always concentrates on stability and availability of servers. The server farm administrators ignore availability of web applications, their services and versions.

According to the current state of the art in application development, load balancers are in place to provide sufficient application stability as well as application performance. Load balancers provide application processing through one or more server farms. However, the following problems can not yet be solved: To publish a new service or a new version of an already established service may turn out to be a nightmare. Unforeseeable problems or errors become visible. The efforts to fix these problems after the version is public are immense. The loss of financial resources and damage of reputation is the immediate response. It is not possible to reactivate reliable versions on a services granularity to help to avoid damages. Secondly, the ability to apply new releases in place sharing the environment of the productive environment is not at hand. Thirdly, performance means can only be raised indirectly.

Today performance problems are reported by users and seldom foreseen by developers or administrators. Today round trip timers like ICMP (ping) are the basis of diagnostic performance. Today redundant servers grouped in server farms are used to reliably deliver applications. If new services or versions of services are published, a subset of these servers is configured to deliver the new service for public beta test. Today it is not possible to deliver versions of applications on basis of the user request.

Today's server farm administration concentrates on server monitoring and to apply up to date patches. Applications are monitored with standard queries. Today content delivery on application granularity is not conducted. The definition of application compatible frameworks and their maintenance is not part of the server farm administration. The developers perform the server administration their selves and document administrative work badly. To publish a new service or version on an already running server farm implies risks for application delivery, because of insufficient documentation of requirements.

It is an object of the invention to allow version-oriented access to applications.

It is a further object of the invention to standardize and simplify processes of application development, especially web application development.

It is a still further object of the invention to securely process application monitoring and application publishing.

SUMMARY OF THE INVENTION

The invention provides an application management system, especially a web application management system, for enabling different clients to access specific versions of an application. The application management system according to the invention comprises means for identifying at least one specific marker associated to the clients or to client requests, means for selecting a specific version of the application for a requesting client based on at least one identified marker, and means for delivering the selected specific version of the application to the requesting client.

The application management system according to the invention provides version-oriented access to applications by secure user authentication as well as client recognition.

Apart from access control, a further key aspect of the invention is release management. The application management system separates development fields with high available server farms for integration, quality assurance and production. All fields share identical prerequisites, such as server patch level.

A still further key aspect of the invention is life cycle management. The application management system allows applications to be published without risks for application delivery. New services, versions and patch levels are applied without service disruption.

According to a further aspect of the invention regarding application response time, the application management system allows real time measurement of application response time.

In general, the application management system unifies processes that allow applications, especially web applications, as well as their server farms to be managed in a holistic way. The holistic principle of unified management is unique. The application management system provides a unified means to manage server farms and their applications. Furthermore, the application management system gives managers a rule base to publish services. Neither developers nor administrators are needed to process the transition of a new services or new versions of a service. With the application management system reliable versions may be reactivated on a services granularity and so help to avoid damages.

The application management system uses markers to establish a rule base to assign versions to user or machine groups.

According to a unique approach of the application management system, response times are continually measured on a service basis. If a threshold is passed additional servers are assigned with load and an alarm is generated.

The application management system conducts content delivery on application granularity by default.

DETAILED DESCRIPTION OF PREFERRED EMBODIMENTS

Figure 1:
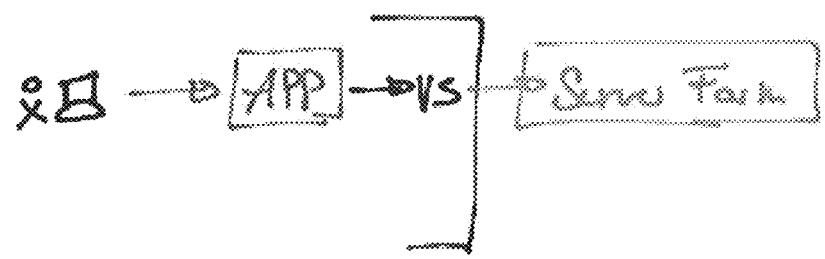
FIG. 1 shows the access hierarchy in a application delivery scenario.

The following description shall provide an understanding of the functionality and the architecture of the application management system according to the invention. Although the system may be commercially launched under the brand name "Web Application Yard" or the corresponding acronym "WAY" and although it is referred to as "web application management system" in the embodiments described below, it is to be understood that the invention is not limited to web applications, but also applies to other applications, such as database applications or the like.

The web application management system standardizes and simplifies processes of web application development. Requirement for the use of the web application management system is a load balancer. The web application management system is designed to enhance load balancer operation. It may be used in conjunction with the widely known BIG-IP load balancer of F5 Networks, Inc. as well as with open source load balancers with LUA programming API.

Current software development processes concentrate on one life cycle. The stability and compatibility of older versions is out of focus. Especially the following issues are not covered by modern software development processes:

Quality assurance of applications lies too often in the hands of developers. Test scenarios are derived from software module capabilities rather than application use cases.

Often test scenarios lack substance and may not be transported from one development field into another. Inter-version tests are technically impossible.

IT departments are devastated by the requirements of application development teams. Development and administration engineers do not share a common language. Misunderstanding leads to lack of quality and stability.

If performance problems occur, no reliable indicators are available. Diagnoses of performance problems are based on costly network analysis. So "shooting in the dark" is very often the only choice to fight lack of performance.

The web application management system allows quality assurance for the following work groups at any time:

IT administrators after patches are applied to a server operating system or application servers like web servers;

software developers during the processes of development;

hotline or QA personnel may prove the existence of bugs or malfunction.

The web application management system separates individual fields of software development as well as production life cycle for applications.

With respect to web application publication, the production environment of the web application management system holds all services and versions at any time. The publication of a specific service or version is done by the configuration of the access rule base. Standard version as well as specific versions may be applied at any time.

The web application management system may be used as a response time monitor. Temporary lack performance may be balanced with automated rules. The response time indicators are based on service and version. This is the ideal base to investigate problems on frontend as well as backend servers.

In the following, the architecture of the web application management system will be described.

The base for the use of the web application management system is a load balancer. The web application management system enhances the operation of the load balancer with the secure administration and monitoring of web applications. The web application management system comprises three modules:

1. Management Console: The web application management system console allows the configuration, administration and monitoring of web applications and its server farms.

2. Application Control: Control of application requests and responses is the core of the web application management system. Here the rule base is applied for life cycle.

3. Performance Monitor: Application response time is always measured and used to apply load on new servers within the server farm.

The web application management system may be used in any software development framework.

Access control allows the web application management system gateway to manipulate the user application request and to assure that a specified version is delivered in the response.

As an example, it would be possible to publish a word processor in different versions. Over years user groups have the tendency to use a particular version of a word processor best. Normally during update the old version is replaced by a new version. With web application management system the users may keep their old versions and may still collaborate on documents with all other users possibly using different versions of the text processor. This approach is a key aspect of the web application management system.

The application (APP) is available through the use of virtual servers (VS). The web application management system concentrates on web application delivery, but other applications may be published, like database applications.

One VS may publish several APPs at any time. APPs are processed by one or more server farms. The corresponding access hierarchy is shown in FIG. 1.

Every virtual application server may bind its availability to IP address space. So VS that are used by internal life cycle processes may or may not be accessible by public. The implementation is done by a generic filter of the VS. The filter is used to distinct internal and external requests to the application.

Figure 2:
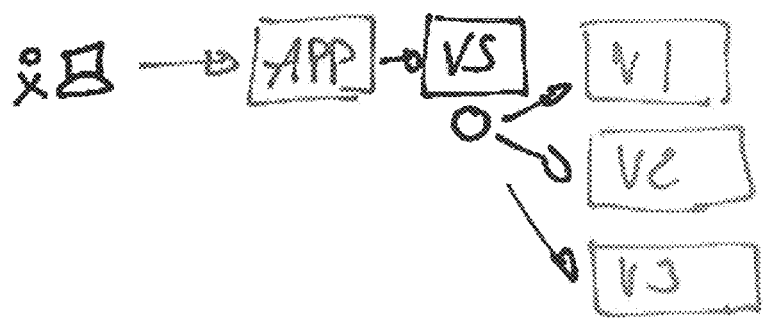
FIG. 2 shows version access towards an APP.

The rule base of version access is finer and may be used in conjunction with a VS access filter. With version access it is possible to apply versions to user groups as well as to groups of machines. Services may be bundled to virtual applications and may be used to apply version within the context of applications. The version access towards an APP is shown in FIG. 2.

The version that is applied to any application request is the standard version. It is possible to gather services to an application with version access to allow to group service version into an application. The group allows to access service versions that rely on one another to deliver content.

With version access every VS has a filter to allow, amongst others RfC1918 recognition;

all APPs have a default version;

all APPs have a version access rule base. The simplest rule base is the definition of the standard version.

Figure 3:
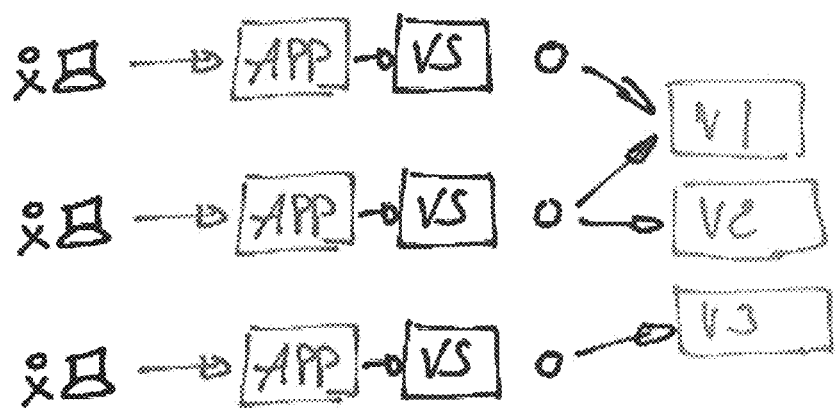
FIG. 3 shows version Access with software development teams.

Software development is done in several teams parallel at the same time. Some teams work on the same version or may rely on new versions of services during development. Without the web application management system this means a very large server farm and error prone configuration. The web application management system allows publishing of services and versions on a VS basis. So the development teams get individual VS assigned to and have an individual version access rule. Version access with software development teams is shown in FIG. 3.

Today development teams work on APPs parallel. Teams work on different APPs or on the same APP and sometimes address other services as a source of data. The web application management system abstracts all VS and their rule base for development teams as integration field.

As an example: Team 1 is assigned to service "showMap" which is found to have a reported bug. Team 2 works in the same service "showMap" on a different version to allow intercontinental routes. Team 3 works on a service "routePlane" which relies on the "showMap" service and crashes due to the bug reported. With the special approach of the web application management system the assignment of service versions the team 3 members are identified, and the specific version currently bug fixed by team 2 is accessed each time the "routePlane" service is called by team 3. Whereas all other service calls to "showMap" have the standard version reply.

Figure 4:
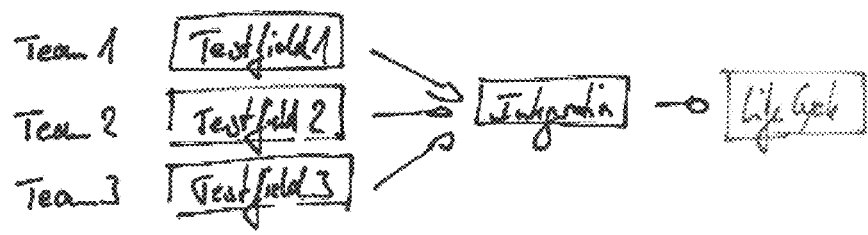
FIG. 4 shows web application management system software development fields.

Each development team uses its own test field. The module tests are applied here with the responsibility of the development team. Each field has its own VS to allow access to APPs. The services are transported into integration field at the end of the software development and a first start of quality assurance (QA). If QA passes, the next transport is into the production life cycle. The web application management system software development fields are shown in FIG. 4.

Three distinct software development fields are applied with the web application management system life cycle. All fields are formed of two application servers with the same configuration as the production life cycle application servers. Each field has its own VS to publish all APPs, formed by services and their versions. Each individual VS has its own access rule base.

With respect to life cycle, the web application management system integrates with various ITIL frameworks. Transport of one service version from one field into another may be done after passing all tests positively. The approach to fulfill the various technical processes is another key aspect of the web application management system.

Integration field comprises two or more application servers, which comply with the configuration of the production environment. Documented requirements are applied and possible new application frameworks are applied. The backend services may be processed by live database information or test database version.

As an example, an order service may route an order to a production plant as well as a notice to the data warehouse. All test scenarios run against dummy applications with database copies, except for the final tests. The final test scenarios may then apply all data exchange on the real production environment to prove quality in a controlled manner.

Figure 5:
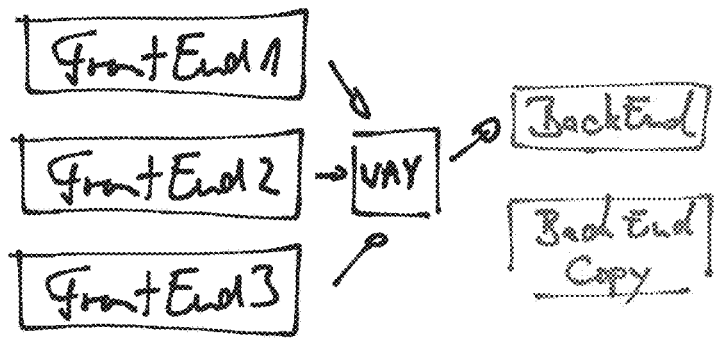
FIG. 5 shows an integration test with two backend scenarios.

The integration field may apply real life data or copy of the production database to allow safe test scenarios. The two backend scenarios, which are shown in FIG. 5, may be switched by the web application management system within different test scenarios.

The production field includes different groups of application servers. These server groups comprises standardized application servers. The application servers do not differ in configuration or layout except the transportation item to be applied. Each server group may at any time change their roles within the production life cycle. The main purpose of the production life cycle is the non-stop application delivery.

As an example of a transportation item a new operating patch level is applied. It is tested each time it flows through the life cycle until all application servers have been successfully tested and the active servers process application requests with the new patch applied.

The production field is the core of the web application management system application delivery. The minimal production field is built by two identical application server groups. The active first group processes the requests to APPS. The second group is standby to cut in automatically case the active group fails or degrades.

The active group processes the application requests of an APP. Temporary performance loss may be healed by assignment of application servers of the reserve group with load. The stand-by group never processes requests. It has the identical processing power as the active group.

The performance of the server farm is continually measured. The application response time is measured by the time that passes for each request to be responded. The granularity is service and version. In case a threshold is defined it is possible to assign additional application servers of the reserve group with load. Also an alarm is generated to inform IT administrator of the event.

The web application management system server farm embraces all mentioned fields. The minimal web application management system server farm comprises seven application servers.

The server farm uses six application servers to form the production fields and a single Golden Master. The Golden Master is used to archive all services and versions of a server farm. It is the only application server that is directly deployed with application source code from the development teams. This is the source of all life cycle steps with the web application management system. The other application servers are grouped into four server groups. All application servers within the production fields have identical resources.

Figure 6:
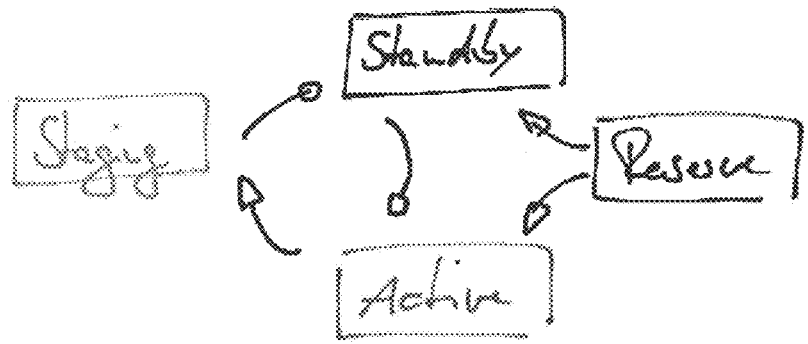
FIG. 6 shows server groups of the production field.

The server groups of the production field, which are shown in FIG. 6, are the following:

Active Group: This application server group processes the requests to all APPs.

Stand-by Group: This group establishes the high availability of the applications. In case of malfunction of the active group this group becomes the active group. To avoid denial of service this swap of load is done automatically only once.

Reserve Group: This group may be assigned load in case response time thresholds are defined. In the case of performance problems the members of this group are equally distributed into active and stand-by group. To avoid denial of service this is only automatically once.

Staging Group: The main purpose of the staging application server group is to stage new transportation items. It is used to quality assure new updates, services and versions to be applied to the server farm.

As an example, the server farm processes the above mentioned services "showMap" and "routePlane". The threshold for "showMap" has not been set, but for routePlane it is set to 750 ms. The continuous measure of the service response time is 35 ms. Now for reasons unknown the "routePlane" service responses raise for the measurement interval above the threshold of 750 ms. This event is logged and an alarm is processed. Say the reserve group has four application servers available. The first two servers are assigned, one to the active and one to the standby group. Now in case the service response time sinks below ⅔ of the threshold no further action is taken. If it sinks under the threshold a little only, another two servers are assigned. Otherwise the web application management system will not assign new application servers with load to prevent denial of service.

The minimum size of a server group is two application servers. The minimal server farm has six productive servers and one archive server. Transition of application servers through a life cycle is performed by the web application management system.

Figure 7:
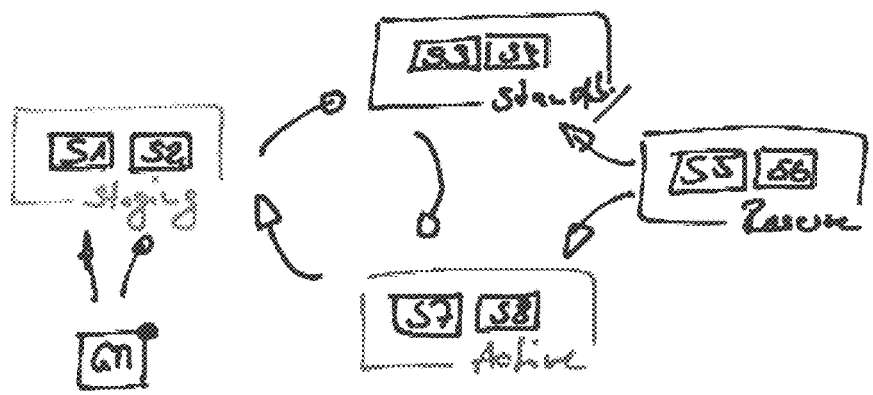
FIG. 7 shows the first step of a life cycle, application servers sharing identical configuration.

The central idea of the web application management system is to deliver non-stop application content without risk of performance. Prerequisite is that all application servers within a server farm share the same configuration and layout, as shown in FIG. 7.

Performance may be degraded during the process of publication of a new service or version. The web application management system avoids performance loss of the application servers during the process. This section describes this process. The transportation item may be a new service or version, a new patch level or a new server operating system.

This example is based on a setup with nine application servers. In the drawings application servers with the new service version applied are marked with a symbolic dot at the top right. At first the Golden Master gets the new service version.

Figure 8:
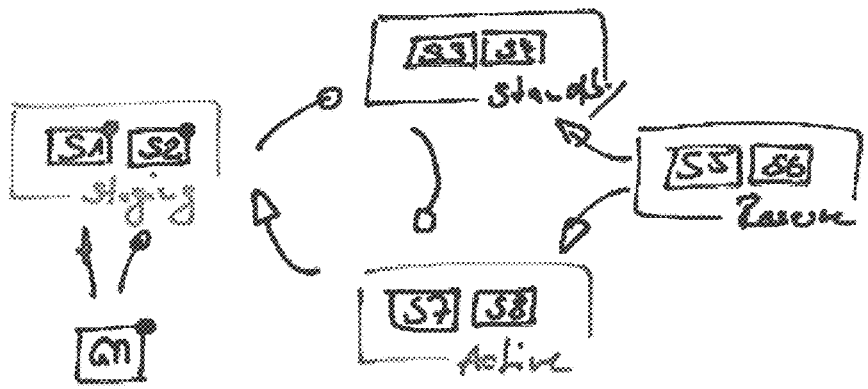
FIG. 8 shows publication of an APP on staging group.

Starting with the next step the application servers of the staging group are staged with the new service version. In this example it would be servers s1 and s2, as shown in FIG. 8 (see dots on top right of both servers s1 and s2).

Now the first server group has the new service version or APP applied. QA may now conduct all test scenarios with all APPs. If the tests pass positively the integrity of the new and already establishes APPs is proved.

Figure 9:
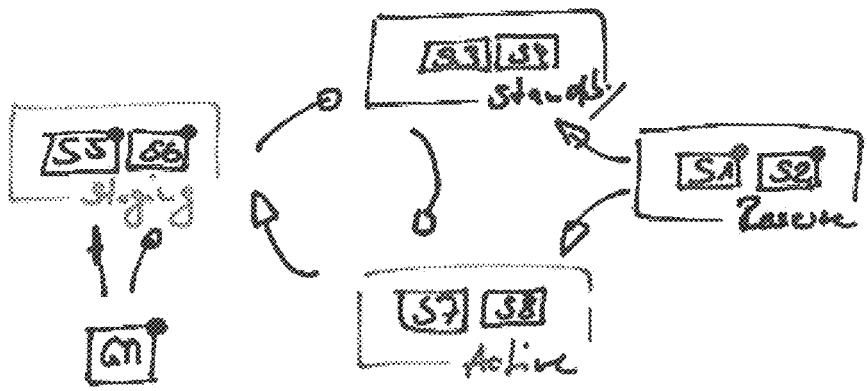
FIG. 9 shows reserve and staging group exchanging roles.
Figure 10:
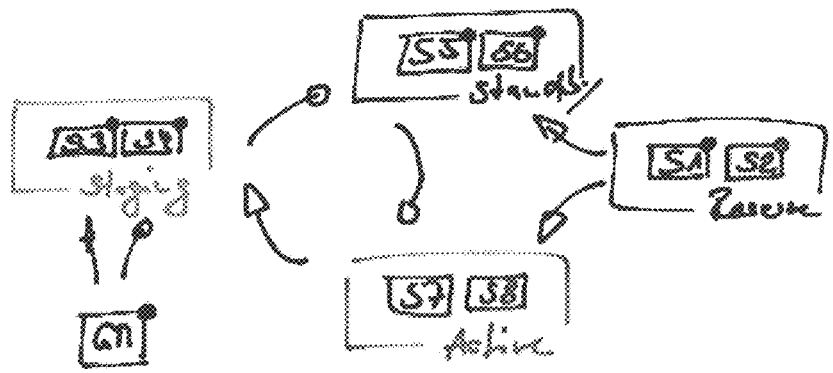
FIG. 10 shows update of the standby group.

At the beginning of the next step the reserve group is blocked. During the transport the automated performance boost is disabled. Then the server group reserve and staging exchange roles, as shown in FIG. 9, so that server s1 and s2 now build the reserve group and server s5 and s6 are the only members or staging group. The reserve group is now unblocked and the automated performance boost enabled. Last the members of the servers of the new staging group are staged and quality checks applied, as shown in FIG. 10.

At the beginning of this step the automated failover is disabled. The server groups standby and staging exchange roles. Next the automated failover is enabled again. Now servers s5 and s6 build the standby group and servers s3 and s4 are staged and tested as the staging group.

Figure 11:
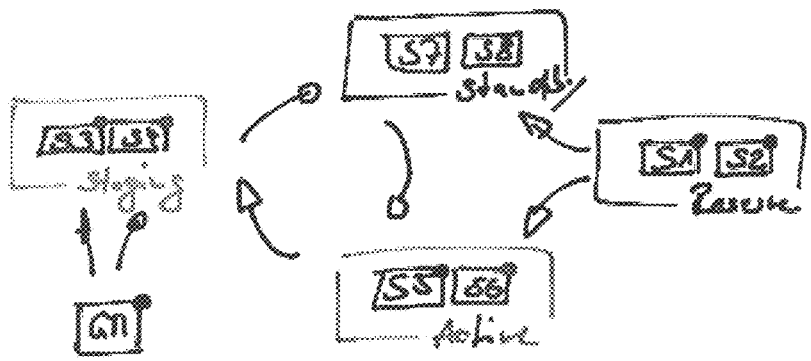
FIG. 11 shows failover to standby group.

At this point the already established APPS have not changed and the new APP is applied into the server farm except the active server group. The active group failovers to the standby group and all open connections are replied and the servers s7 and s8 will drain, as shown in FIG. 11. No performance degradation happens since the two server groups have the same resources to process APP requests. This step should be kept at minimal duration, since the automated failover is disabled.

Figure 12:
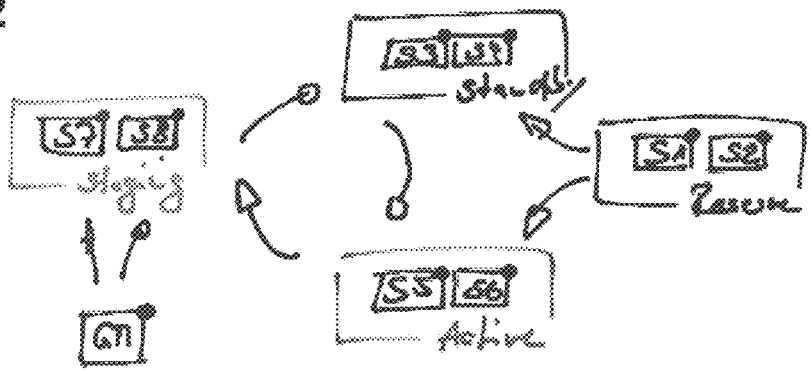
FIG. 12 shows the last step of the life cycle.

With the final step, which is shown in FIG. 12, the roles of standby and staging group are exchanged. Now the automated failover is enabled again. At last the new staging group is staged and tested again.

Now the server farm has the new service version applied. It still processes APP requests based on the current rule base. The activation of the new service version may be applied at any time from now.

To address APPs and their services a version rule base has to be applied. As stated earlier the minimal version rule base defines the standard version. This version of a specific service is applied without further specification of the client by default. It is also known as the default version of a service.

A client may provide marker with which the version rule base identifies and delivers a specific version of the service. The web application management system uses the following markers to identify a client and subsequently applies a specific version:

IP Address Marker: An IP address, lists of IP addresses and IP subnets may be used to apply specific versions on the service request.

DNS (Domain Name System) Marker: Domain names and specific client DNS names may be used to avow reverse DNS service and identify a specific client or group of clients, User Group Marker: In case the APP will not anonymously respond to APP requests user authentication is activated. The web application management system may use user name or user group name to identify a client.

Application Name html-Header Marker: In case several services form a virtual application, the application name is identified with a html-Header value. This header may be a cookie and identifies the client.

Certificate Marker: A user certificate may be used to identify a specific client.

URI Marker: The client may append a marker to the URI to identify itself for the assignment of a service version.

In the following description some of the key aspects of the web application management system are summarized again and illustrated by a specific example.

The web application management system framework allows secure publication of applications, especially web applications.

Today version based application delivery is not possible. Access to specific versions of services is needed, when parameters of applied processes change. With the web application management system it is possible to address specific versions without the need of an application to be aware of different versions.

Versions may be applied on the application request. The default version is applied if the client has no marker identified. If a marker is found a specific version may be applied.

As an example, an automated drilling machine requests the layout of holes for a hinge to be drilled into a work piece. The first version of the service "getHinge" delivers three hole coordinates for each hinge to be fixed. The new version is implemented because the new drilling machines drill the three hinge holes in one process. So the new version responds with one hole coordinate only. The old machine needs a marker to be applied to identify the client and to request the old version of the service.

Each request to an application is checked within the web application management system. At simplest the default version is applied to the request. The process is done by manipulation of the URL request to the application:

The request of this structure is the base "http://app.my-server.com/public/showMaps" and will be altered into the request that is applied to the server farm "http://appserver.serverfarm.local/public/v0001/public/showMaps".

So version "v0001" is applied as the service version. At the same time the "pretty URL" may be changed into an "ugly URL" on the server farm. This process allows access to specific versions of a service. In addition it allows the request to be assigned to a specific server farm.

The rule base has the following top down format:

| marker | service | version |
|---|---|---|
| 192.168.10.2/32 | showMaps | v0004 |
| 10.8.0.0/16 | showMaps | v0003 |
| <standard> | showMaps | v0001 |

To follow general IT rules the rule base is processed top down first match.

All requests are identified by the web application management system with an ID. This ID marks requests and applies to responses as well. web application management system screens responses and actively controls response formats if needed.

As an example the driller machine is used again. Say the service cannot be changed for unknown reasons and so the response of the version still replies with three hole coordinates, in this situation the web application management system may apply the response version rule base as well. In this case Json format is used.

The response looks like:

```
{
    "hinge" : {
        "name": "hinge",
        "drillHole": {
            "name": "top",
            "pos": {
                "xpos": "234",
                "ypos": "100"
            },
            "name": "middle",
            "pos": {
                "xpos": "240",
                "ypos": "105"
            },
            "name": "bottom",
            "pos": {
                "xpos": "234",
                "ypos": "110"
            }
        }
    }
}
``` and is changed by the web application management system with

```
{
    "hinge" : {
        "name": "hinge",
        "drillHole": {
            "name": "top",
            "pos": {
                "xpos": "234",
                "ypos": "100"
            }
        }
    }
}
```

This is the response version rule base. It may be applied to XML format as well.

The web application management system life cycle allows publication of services, especially web services without service interruption. It is used to apply new services or versions. It is used to apply patches to servers and is used to apply new operating systems as well.

Figure 13A:
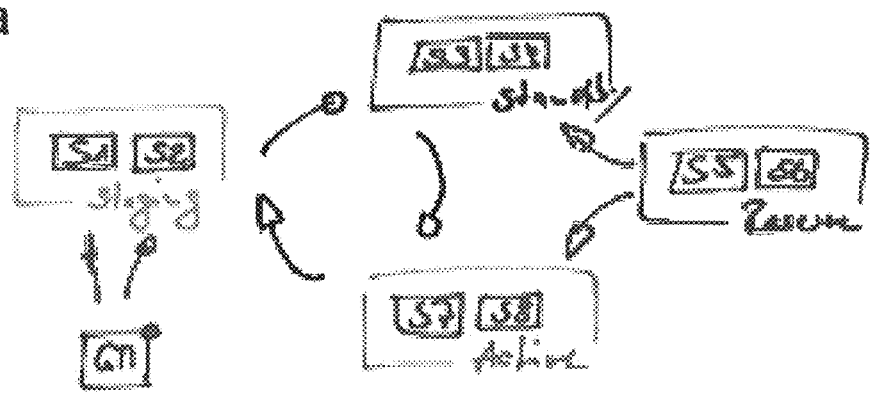
FIGS. 13a and 13b show transport of the new service into the test field.
Figure 13B:
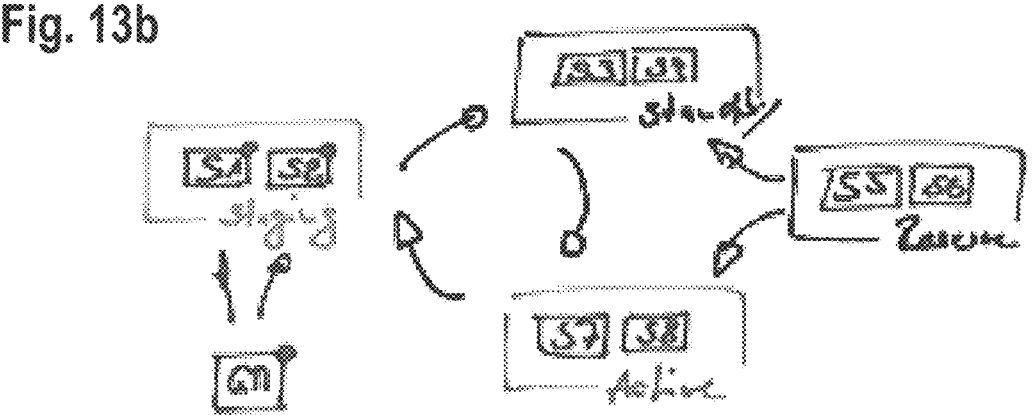
Figure 14A:
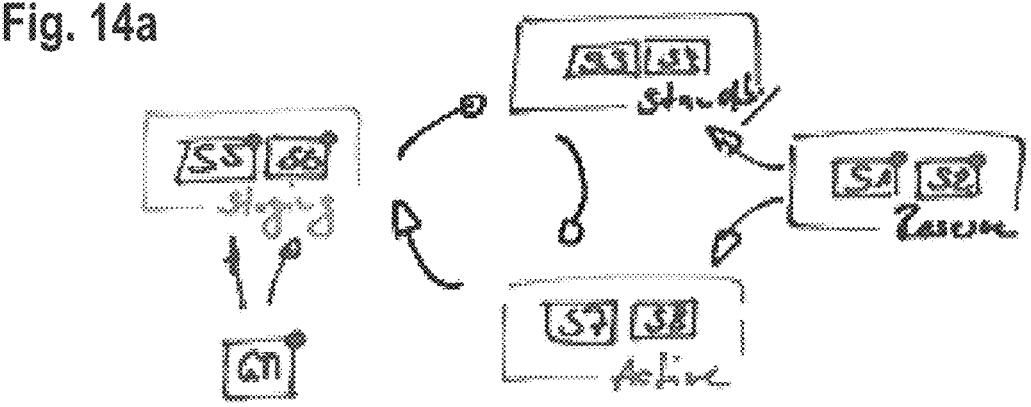
FIGS. 14a, 14b, 14c and 14d show the steps of the life cycle.
Figure 14B:
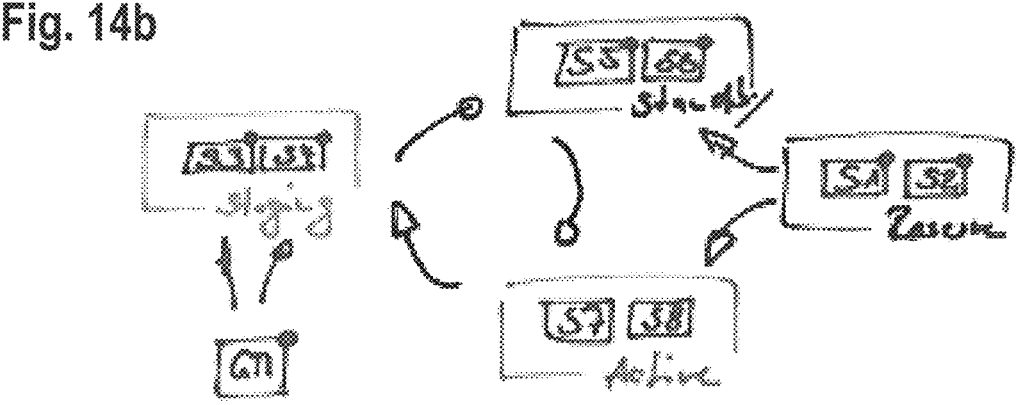
Figure 14C:
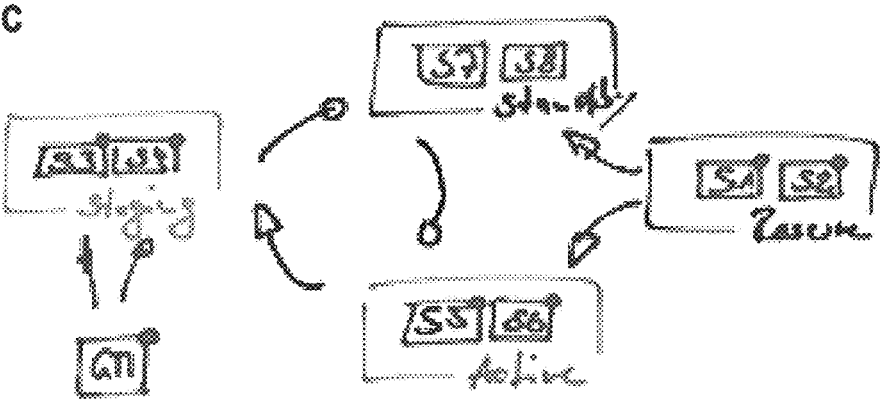
Figure 14D:
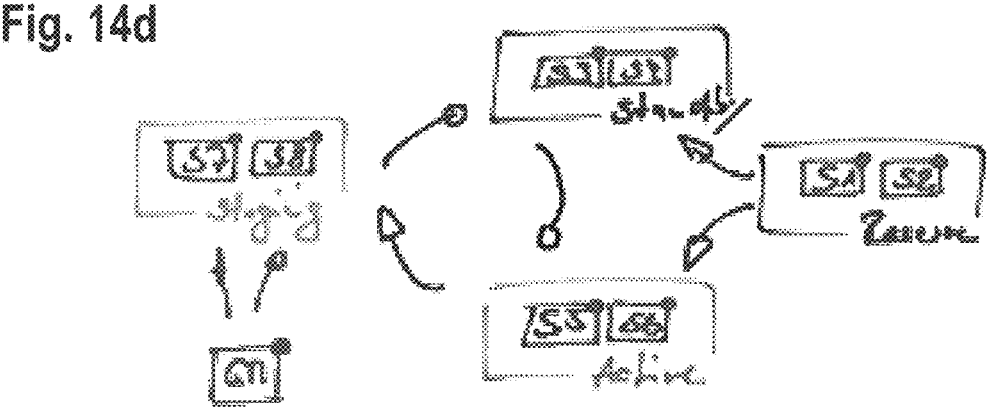

Core of the fife cycle are well known fields of the software development circle. These fields are: Development Field. Test Field and Production Field. The software developer finishes his work within the development field. The software developer tests the modules of the service. Then quality assurance transports the service into the test field, as shown in FIGS. 13a and 13b. QA applies all test scenarios and rejects the service back to development or transports the service into the production field.

With the web application management system the development teams have their integration server groups. These servers are not part of the web application management system life cycle. The life cycle begins with the transportation of the service onto the Golden Master by the developer. The test field is the staging server group which is used by quality assurance to prove stability and integrity.

In case all test scenarios are passed the new service is transported again and again into the staging server group. With each step in the life cycle another server group changes its role with the staging group. The steps of the life cycle are shown in FIGS. 14a to 14d.

Transport of source or binary code as well as the configuration of the subsystems is performed in a cyclic manner sourced by the Golden Master into the staging group. With the four steps the functional roles of the server groups are exchanged. With this specific process the duration of partial loss of functionality of the server groups is minimized. At the same time the risk of service disruption or performance degradation is minimized.

In the first step (FIG. 14a) the roles of the server groups staging and reserve are exchanged. During the process the automated performance boost is disabled. The application servers of the now new staging group get the new service applied. When the performance boots is triggered during the next steps the life cycle may be carried out without endangering application delivery. Only application servers that have not already been applied the new version are staged during staging.

The second step (FIG. 14b) is carried out with the exchange of roles of the staging and the standby server group. During the process the automated failover is disabled. Next the staging group again is applied with the new service. Should at this time the automated failover occur the next step is omitted.

The third step (FIG. 14c) is the failover of the active with the standby server group. The step is finished when all active connections to the standby application group are drained.

The final step (FIG. 14d) is the exchange of roles of standby and staging group again. During the process the automated failover is disabled. After the staging group has the new service applied the whole server farm is capable of processing the new service.

In the following, user authentication with respect to the web application management system is described.

Today user authentication is the weak spot of web applications. Since the SSL protocol is easily compromised one time passwords are used for security reasons and to frustrate users.

The web application management system has a specific way to do secure authentication neglecting the possibility of eavesdropping the user credentials. The web application management system uses its own backend service to authenticate users. At the very beginning a unique ID is generated and kept into a html header cookie.

First the client generates an RSA key pair and transports its public key to the backend server. The "getKey" service is used to transport the client public key to the backend server.

The server generates its own RSA key pair. Next the server public key is enciphered with the client public key and transported to the client on the "getKey" response. Now there are two RSA key pairs, one on each side of the communication.

In addition to the RSA public key exchange the web application management system generates an AES key that is used to encrypt the unique ID that is generated every time a client requests APP data.

The username and the password are entered by the user and encrypted with the server public key and may not be intercepted. The web application management system uses the username as a marker of the client to apply the version rule base.

I claim:

1. A web application management system to enable access to specific versions of a web application,
the web application management system comprising:
a load balancer for hosting the web application management system,
a version rule base associated to the web application, the version rule base comprising rules for selecting web application versions based on markers,
means for identifying at least one specific marker associated to the clients or to client requests, the at least one specific marker being selected from an Internet Protocol address marker, a Domain Name System marker, an application name html-header marker, a certificate marker, or combinations thereof,
means for selecting a specific version of the web application indiscernible to the requesting client based on at least one identified marker, and
means for routing a client request to the selected specific version of the web application to compute the response for the requesting client.

2. The web application management system according to claim 1, wherein the at least one specific marker is an Internet Protocol address marker.

3. The web application management system according to claim 1, wherein the at least one specific marker is a Domain Name System marker.

4. The web application management system according to claim 1, wherein the at least one specific marker is an application name html-header marker.

5. The web application management system according to claim 1, wherein the at least one specific marker is a certificate marker.

6. The web application management system according to claim 1, further comprising means for manipulating an Uniform Resource Locator request to the application based on the at least one identified marker.

7. The web application management system according to claim 1, further comprising means for applying a version rule base in case of failed version response by the application.

8. An application management system for enabling different clients to access specific versions of an application,
the application management system comprising:
means for identifying at least one specific marker associated to the clients or to client requests,
means for selecting a specific version of the application for a requesting client based on at least one identified marker,
means for delivering the selected specific version of the application to the requesting client, and
a life cycle management system for secure publication of applications without service interruption,
wherein the life cycle management system includes a production field with a server farm having a plurality of application servers sharing the same configuration and layout, the life cycle management system further including means for transitioning the servers to become different functional server groups through a life cycle, the functional server groups including
an active group processing requests to all applications,
a stand-by group, the life cycle management system being capable of appointing the stand-by group as the active group in case of malfunction of the active group, and
a staging group staging new transportation items and being used to quality assure new updates, services and/or versions to be applied to the server farm.

9. The application management system according to claim 8, the functional server groups further including a reserve group that is assigned load in case response time thresholds are exceeded.

10. The application management system according to claim 9, wherein the life cycle management system includes means for transporting a new service onto a Golden Master server.

11. The application management system according to claim 10, wherein the life cycle management system includes means for staging the application servers of the staging group with the new service from the Golden Master server.

12. The application management system according to claim 11, wherein the life cycle management system includes means for transitioning the application servers of the reserve group to become the application servers of the staging group and vice versa.

13. The application management system according to claim 12, wherein the life cycle management system includes means for transitioning the application servers of the stand-by group to become the application servers of the staging group and vice versa.

14. The application management system according to claim 13, wherein the life cycle management system includes means for transitioning the application servers of the stand-by group to become the application servers of the active group and vice versa.

15. The application management system according to claim 1, further comprising a backend service which is used as a user authentication system.

16. The application management system according to claim 15, wherein the user authentication system includes means for generating a unique ID in an html header cookie.

17. The application management system according to claim 16, wherein a client includes means for generating an Rivest-Shamir-Adleman public-key cryptosystem key pair and transporting its public key to a backend server.

18. The application management system according to claim 17, wherein the backend server includes means for generating its own Rivest-Shamir-Adleman public-key cryptosystem key pair.

19. The application management system according to claim 18, wherein the backend server includes means for enciphering the public key with the client public key and transporting the enciphered public key to the client.

20. The application management system according to claim 16, wherein the user authentication system includes means for generating an Advanced Encryption Standard key that is used to encrypt the unique ID that is generated every time a client requests application data.

* * * * *